US008131121B2

(12) United States Patent
Huffman (10) Patent No.: US 8,131,121 B2
(45) Date of Patent: Mar. 6, 2012

(54) OPTICAL FIBER PIPELINE MONITORING SYSTEM AND METHOD

(75) Inventor: John S. Huffman, Conyers, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 12/498,545

(22) Filed: Jul. 7, 2009

(65) Prior Publication Data

US 2011/0007996 A1    Jan. 13, 2011

(51) Int. Cl.
  *G02B 6/00* (2006.01)
(52) U.S. Cl. .............................. 385/12; 385/13; 356/73.1
(58) Field of Classification Search .................... 385/12, 385/13; 356/73.1
See application file for complete search history.

(56) References Cited

U.S. PATENT DOCUMENTS

| | | | |
|---|---|---|---|
| 4,477,725 A | | 10/1984 | Asawa et al. |
| 4,534,222 A | * | 8/1985 | Finch et al. ..................... 73/653 |
| 5,194,847 A | | 3/1993 | Taylor et al. |
| 5,218,197 A | * | 6/1993 | Carroll ..................... 250/227.19 |
| 5,778,114 A | | 7/1998 | Eslambolchi et al. |
| 6,004,639 A | * | 12/1999 | Quigley et al. ............. 428/36.3 |
| 6,191,414 B1 | * | 2/2001 | Ogle et al. ............... 250/227.14 |
| 6,233,374 B1 | * | 5/2001 | Ogle et al. ....................... 385/13 |
| 6,449,400 B1 | | 9/2002 | Watanabe et al. |
| 6,782,150 B2 | * | 8/2004 | Davis et al. ..................... 385/12 |
| 6,813,403 B2 | * | 11/2004 | Tennyson ........................ 385/12 |
| 7,136,156 B1 | | 11/2006 | Quint |
| 7,245,791 B2 | * | 7/2007 | Rambow et al. ................. 385/12 |
| 7,262,834 B2 | * | 8/2007 | Kageyama et al. ............. 356/28 |
| 7,315,666 B2 | * | 1/2008 | Van Der Spek ................. 385/12 |
| 7,711,217 B2 | * | 5/2010 | Takahashi et al. .............. 385/12 |
| 2002/0007948 A1 | * | 1/2002 | Bayne et al. ................... 166/278 |
| 2008/0088846 A1 | | 4/2008 | Hayward et al. |
| 2008/0144016 A1 | | 6/2008 | Lewis et al. |

FOREIGN PATENT DOCUMENTS

CN    1837674 A    *    9/2006

* cited by examiner

Primary Examiner — Daniel Petkovsek (57) ABSTRACT

In accordance with one aspect of the present invention, a fiber surveillance system for monitoring a pipeline is provided. The surveillance system includes an optical fiber acoustically coupled to the pipeline to detect acoustic signals associated with vibrations or other activity near or from the pipeline. Optical energy is injected into the optical fiber and an optical detector receives an optical return-signal having certain characteristics resulting from vibrations impinging on the optical fiber. An analyzer is configured to determine operating information about the pipeline based on the optical return-signal. Two or more fibers can be acoustically coupled to the pipeline and arranged in varying configurations to yield greater resolution.

16 Claims, 10 Drawing Sheets

OPTICAL FIBER PIPELINE MONITORING SYSTEM AND METHOD

FIELD

The present invention relates to optical fiber surveillance systems and methods, and more particularly to methods and systems for monitoring pipelines using optical fiber surveillance systems.

BACKGROUND

U.S. Pat. No. 5,194,847 discloses an apparatus for sensing intrusion into a predefined perimeter comprising means for producing a coherent pulsed light, which is injected into an optical sensing fiber having a first predetermined length and positioned along the predefined perimeter. In response to receiving the coherent light pulses, a backscattered light is produced and coupled into an optical receiving fiber. The backscattered light is detected by a photodetector, and a signal indicative of the backscattered light is produced. An intrusion is detectable from the produced signal as indicated by a change in the backscattered light. To increase the sensitivity of the apparatus, a reference fiber and an interferometer may also be employed.

U.S. Pat. No. 5,778,114 discloses a fiber analysis system that detects threats to a buried underground fiber by delivering two optical sub-signals, split from a single beam, into opposite ends of the fiber so that the sub-signals traverse the fiber in opposite directions. The sub-signals are recombined into a beam whose characteristics are detected by a detector. The output signal of the detector is compared by a processor to different reference values stored in a database representing different detector output signals corresponding to different fiber conditions. By matching the detector output signal to a reference value associated with a particular fiber condition, the processor can determine whether a potential threat exists. By inducing a sequence of known vibrations (tones) in the fiber at spaced locations generally orthogonal to the fiber, the processor can establish the location of the fiber by comparing the detector output signal to reference signals corresponding to the known tones to determine which one was received in the shortest time.

U.S. Patent Application Publication 2008/0088846 discloses an improved technique for acoustic sensing that involves launching a plurality of groups of pulse-modulated electromagnetic waves into a medium. The frequency of electromagnetic waves in a pulse within a group differs from the frequency of the electromagnetic waves in another pulse within the group. The energy scattered by the medium is detected and may be used to determine a characteristic of the environment of the medium. For example, if the medium is a buried optical fiber into which light pulses have been launched the presence of acoustic waves within the region of the buried fiber can be detected.

U.S. Patent Application Publication 2008/0144016 discloses subject matter similar to U.S. Patent Application Publication 2008/0088846. However, U.S. Patent Application Publication 2008/0144016 further discloses that, in one embodiment, the beat signal of the detected energy scattered by the medium may be used to determine a characteristic of the environment of the medium.

U.S. Pat. No. 4,477,725 discloses a system for remote measurement of structural forces that includes a plurality of microbend transducers mounted along the length of the structure for microbending an optical fiber in response to structural forces, such as stress acting upon an oil or gas pipeline. An optical time domain reflectometer (OTDR) has a light source for launching a pulsed optical signal for passage through the fiber and a photodetector for sensing as a function of time the intensity of backscattered light reflected back through the fiber, wherein this sensed time function is correlated directly with discrete longitudinal positions along the length of the fiber and the structure. When one or more of the microbend transducers is activated to induce a microbend in the fiber in response to localized forces acting upon the structure, a portion of the backscattered light is lost at the microbend. This attenuation in backscattered light intensity is sensed quantitatively and positionally identified by the photodetector.

U.S. Pat. No. 6,449,400 discloses that a sensing optical fiber can detect information with a high detection sensitivity by an OTDR method using Rayleigh scattered light. For this purpose, the sensing optical fiber includes a main line element which is an optical fiber installed as a light transmission line and sensor elements which are relatively short optical fibers that are inserted in intermediate parts of the main line element and whose core diameters are different from that of the main line element. A sensor system includes sensing optical fibers and a measuring instrument which detects information around the light transmission line, in which the sensing optical fibers are provided, by using back-scattered light of the sensing optical fibers. In the sensor system, a plurality of the sensing optical fibers is provided, and the sensing optical fibers have a different number of the sensor elements, different distances between the sensor elements, and different sensor element core-diameters. An optical switch, by which the sensing optical fibers are selectively switched, is provided between the sensing optical fibers and the measuring instrument. The system can be applied for the following purposes: (1) Detection of distortion, fatigue, rupture or the like in structures such as general buildings, high-rise buildings, speedways, elevated bridges, tunnels, dams, flying fields, harbor facilities, and industrial facilities; (2) Detection of distortion, fatigue, rupture or the like in moving structures such as frames of airplanes, ship hulls, frames of motorcars, frames of railroad vehicles, and spacecraft bodies; (3) Detection of distortion, fatigue, rupture or the like in general building materials such as steel frames, wallplates, flooring, ceiling panels, and connecting fittings; (4) Detection of distortion, fatigue, rupture or the like in life-lines such as oil pipelines, oil storage tanks, gas pipelines, gas tanks, water pipelines, electric cables, and (maritime or underseas) communication cables; (5) Supervision for guarding against intruders into or protecting the environment of buildings, parks, and outside facilities; (6) Supervision of diastrophism and ground subsidence (for earthquake prediction); (7) Supervision or observation of living bodies; and (8) Detection of liquid adhesion."

U.S. Pat. No. 7,136,156 discloses a method, system, and medium for Optical Time Domain Reflectometer (OTDR) Data storage and retrieval in a networking environment. The method includes receiving an OTDR trace file in its native format that includes OTDR information, storing the trace file, receiving a request to present the OTDR information in a browser or some other interface, identifying a viewer that can render the OTDR information, and communicating the OTDR information to the browser. The system includes a user interface that facilitates uploading an OTDR trace file in its native format, a storage device for receiving the trace file, and a viewer that can render the data within the OTDR trace file.

SUMMARY

In accordance with one aspect of the present invention, a fiber surveillance system is used to enable monitoring of pipelines for various operating information. The fiber surveillance system includes an optical fiber acoustically coupled to at least a section of a pipeline. A source of optical energy is configured to inject optical energy into the optical fiber, and an optical detector is configured to detect a return-signal on the optical fiber. The return signal has certain characteristics that result from various vibrations impinging on the optical fiber. An analyzer is configured to determine the pipeline operating information based on the characteristics of the return signal.

The results of the analysis of the return signal may be compared with historical return signals from the monitored pipeline, or with other stored data, to determine abnormalities and/or operating information and locate events along the pipeline. A database of signatures associated with known conditions and/or disturbances and/or the historical behavior of signatures from a given structure (e.g., pipeline) or environment may be compared to a detected signal to further analyze the detected signal and obtain more detailed information about the relationship between the detected signal and the condition of the structure (e.g., pipeline) or the environment in which the disturbance is located. Upon detection of such abnormalities or conditions automated and configurable actions may be initiated by the system including generating alerts, modifying operating parameters of the pipeline, and shutting down all or part of the pipeline to prevent damage or additional problems.

Fibers that are used to detect the vibrations, acoustic signals or other disturbances can be arrayed in a single dimensional topology (e.g., fibers along the pipeline in substantially linear paths) or multi-dimensional topology (e.g., fibers wrapped along the pipeline). In one embodiment of the present invention, the fiber is arranged in a helical configuration to improve the spatial resolution of the system and the operational sensitivity. In a further embodiment, multiple fibers are wrapped around the pipeline in an n-helical configuration. Optionally, the helixes of the fibers can have varying pitch and direction (e.g., clockwise or counter-clockwise) so as to overlap or intersect to produce a grid-like topology.

The optical fiber can be acoustically coupled to the pipeline in various ways. For example, the fiber can be acoustically coupled by placement in the ground near the pipeline or in the pedestals on which the pipeline stands. Alternatively, U-bolts, U-tracks, cements, or adhesives can be used to couple the fiber to the pipeline. In a further feature, the fiber can be blown through a section of installed pipeline. Alternatively, the fiber can be embedded in the pipe during manufacturing of the pipe, for example through a co-extrusion process, or installed post-construction of the pipeline by retrofitting the pipeline These and other advantages of the invention will be apparent to those of ordinary skill in the art by reference to the following detailed description and the accompanying drawings.

DETAILED DESCRIPTION

Figure 1:
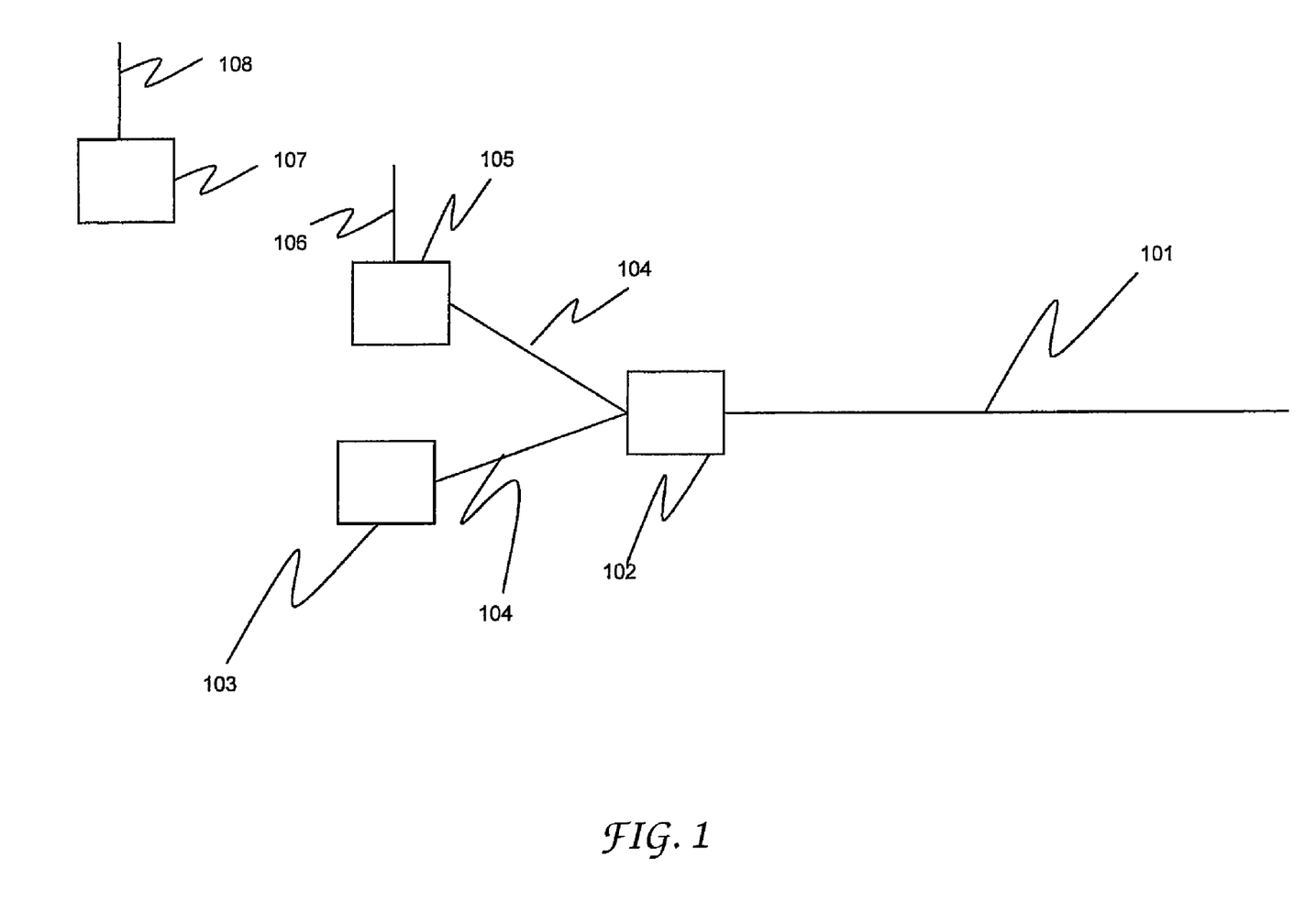
FIG. 1 is a schematic representation of an embodiment of the present invention.

FIG. 1 is a schematic representation of a remote fiber surveillance configuration in accordance with one embodiment of the present invention. In this Figure, optical energy source 103 injects optical energy into fiber 101. As would be understood by persons having ordinary skill in the art, the source 103 of optical energy can be, for example, a laser. Detector 105 detects the return signal (i.e., the "backscattered signal") emitted from the fiber in accordance with the particular technology used by the surveillance system, such as Raleigh scattering or OTDR technology. As would be understood by persons having ordinary skill in the art, the detector 105 of optical energy can be, for example, a semiconductor photo-detector. Detector 105 can also include the necessary electronics (e.g., an analyzer), such as a digital signal processor, for analyzing the return signal to determine, for example, characteristics of an exemplary acoustic signal impinging upon the fiber at some point along its length. It would be understood that the impinging signal need not be limited to acoustic signals, but can be any type of signal that will affect the return optical signal in a way that can be analyzed by the analyzer to determine characteristics of the impinging signal. Splitter/Combiner 102 injects the optical energy into the fiber and removes the return signal from the fiber. Fiber segments 104 are appropriate fiber segments for bringing the injected and return signals to source 103 and detector 105 respectively. However, the source 103 and detector 105 can be directly connected to the splitter/combiner. It would be understood by persons having ordinary skill in the art that the source 103 of the injected optical signal and the analysis instrumentalities may be included in a single structure.

In one aspect of the present invention, the remote fiber surveillance configuration can include a wireless transmitter 105 having an appropriate antenna 106 that transmits a signal to a wireless receiver 107 with appropriate antenna 108. Thus, the remote fiber surveillance system can be deployed in one location and monitored from a different location, optionally in real time, without requiring wired communication with the source 103 and detector 105. For example, the surveillance system could be deployed along various pipelines in Alaska and Texas, but both deployments could be monitored from a central monitoring station in Colorado. It would be understood by one having ordinary skill in the art that antennae 106 and 108, as well as the transmitter 105 and receiver 107 can be of any appropriate configuration and technology for transmitting and receiving wireless signals respectively. The wireless transmitter 105, receiver 107, and antennae 106 and 108 can involve any over-the-air transmission technology. It will be further understood that the analysis instrumentalities can be included in either transmitter 105 and/or receiver 107 and that either or both can be connected to appropriate storage media to save data prior to or after processing. The wireless transmissions can occur continuously to provide continuous monitoring or, in a "sometimes-on" embodiment, can occur periodically or at selected times In an alternative embodiment of the present invention, multiple fibers, such as those illustrated in FIG. 1, are deployed, each with their own instrumentalities. The instrumentalities can include networking devices that form a wireless network so that they can interact with each other to more effectively monitor the environment where they are located. Additional instrumentalities can include image equipment such as cameras to aid in the monitoring function.

Figure 2:
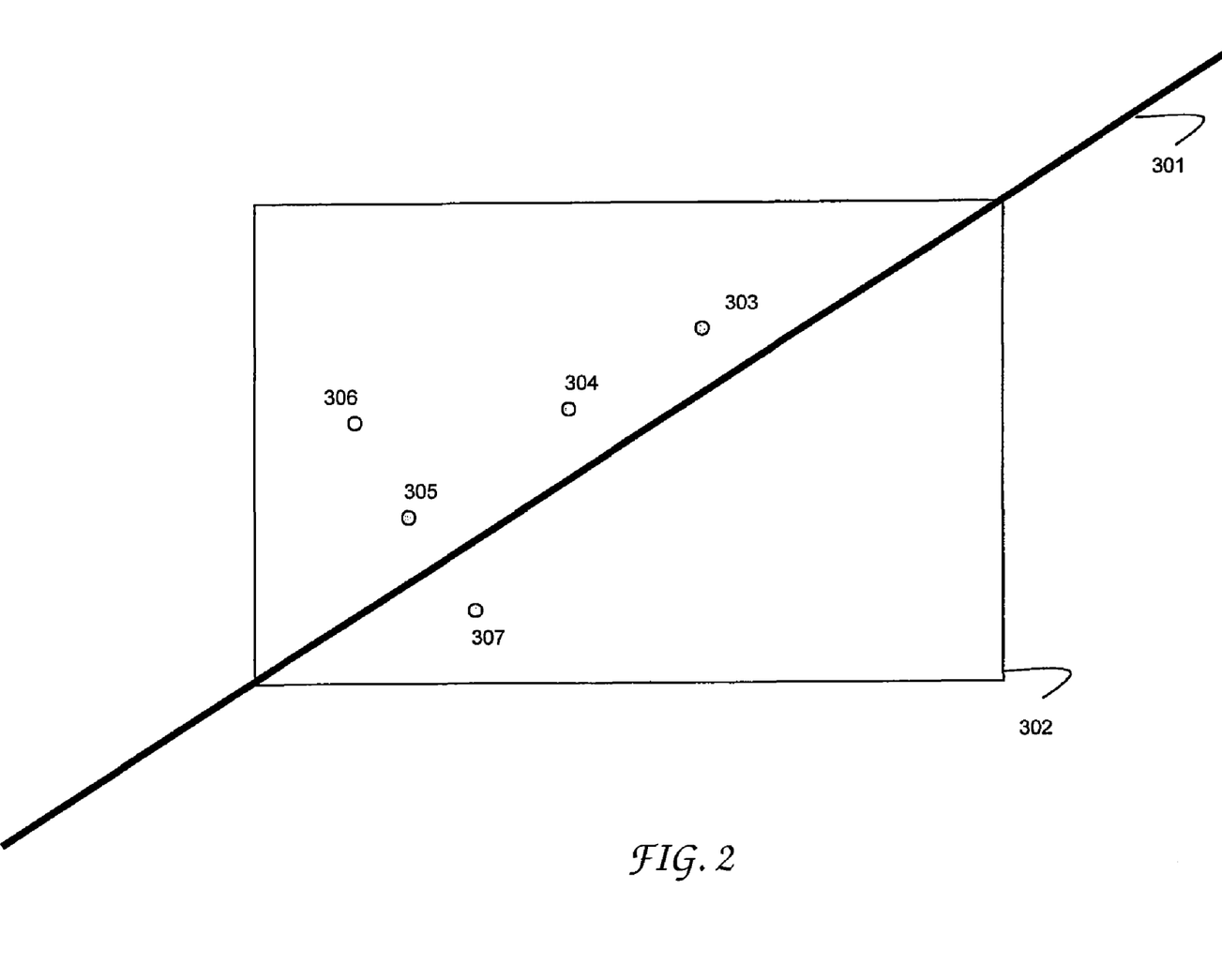
FIG. 2 is a schematic representation of an exemplary fiber topology in accordance with an embodiment of the present invention.

FIG. 2 is a schematic representation of a fiber that may be deployed in accordance with the present invention over a two dimensional area 302. Fiber 301 is shown, for simplicity, without the instrumentalities shown in FIG. 1. References 303, 304, 305, 306, and 307 (i.e., 303 through 307) are disturbances that are monitored by the fiber surveillance system. References 303 through 307 are, for example, acoustic disturbances that can be detected by the fiber surveillance system. These signals can be in the frequency range of between 20 Hz or 50 Hz on the low frequency side, and 20,000 Hz, 50,000 Hz, or 100,000 Hz on the high frequency side.

The fiber topology illustrated in FIG. 2 is substantially linear and one-dimensional. Because most fiber surveillance and/or monitoring systems locate a disturbance by its lateral distance along the fiber 301, the locations of the disturbances identified as 303, 304, and 305 can be identified and distinguished because they occur at different lateral distances along the fiber 301 (i.e., different distances along the fiber 301 from the optical energy source (not shown)). However, the location of the disturbances 305, 306, and 307 cannot be easily distinguished because they are located at the same lateral distance along the fiber, even though they are displaced perpendicularly from the fiber by different distances. Nevertheless, the locations of disturbances 305 through 307 can be distinguished using a two dimensional, overlapping topology, as discussed in greater detail below in the context of FIG. 3.

Figure 3:
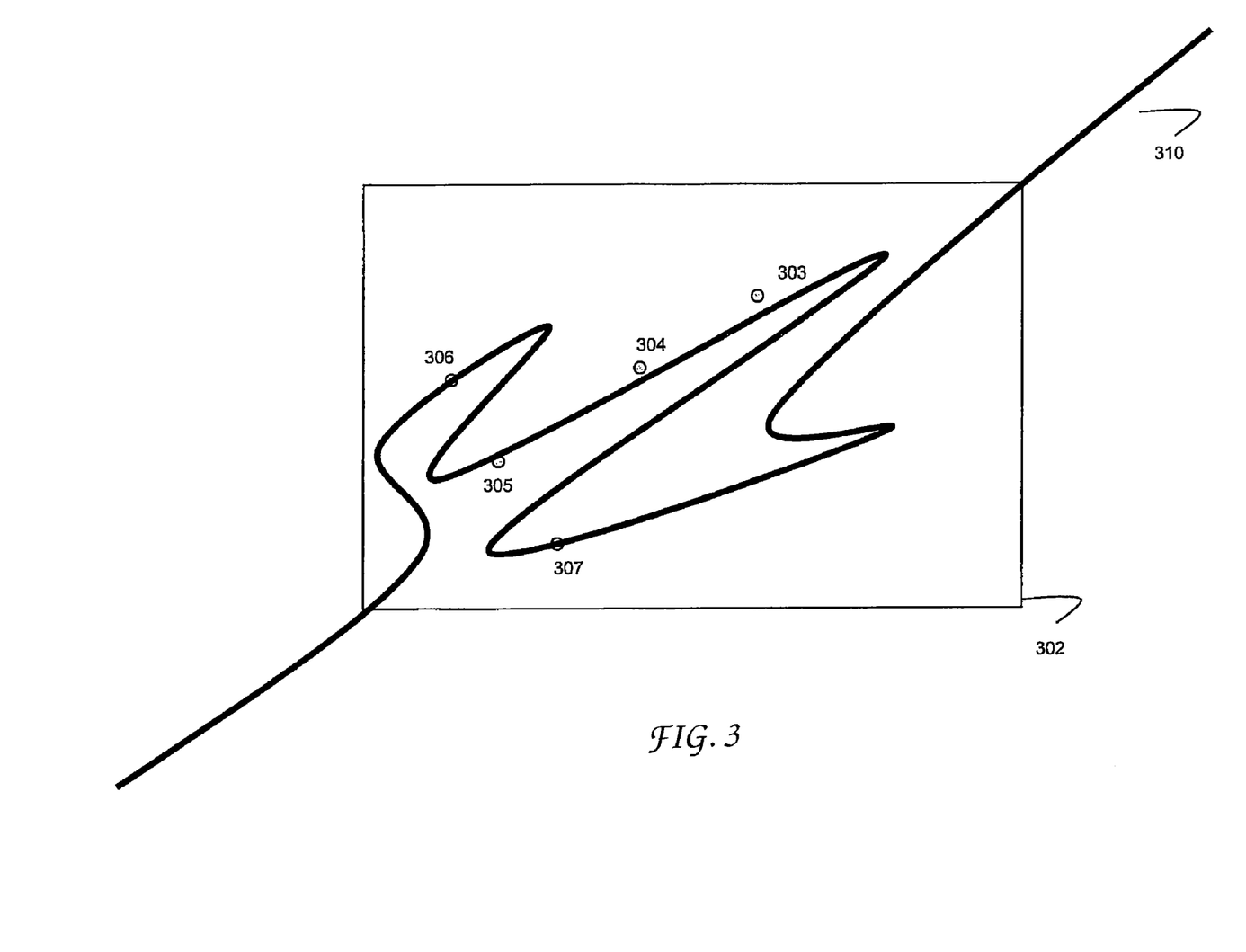
FIG. 3 is schematic representation of an alternative fiber topology in accordance with an embodiment of the present invention.

In the embodiment of FIG. 3, the fiber 310 is shown as having a two dimensional topology, rather than the one dimensional, linear topology of the fiber shown in FIG. 2. In this figure, items from FIG. 2 are reproduced with the same numbers. The fiber 310 meanders or serpentines over a two-dimensional surface 302. Accordingly, in this figure, even sources 305 through 307 occur at different distances along the fiber and, therefore, their spatial location can be resolved with much greater accuracy than with the topology shown in FIG. 2.

It will be noted that in the two dimensional topology of FIG. 3 there is greater fiber coverage in a given rectangular area than when the fiber is oriented in single dimensional topology of FIG. 2 (i.e., the system of FIG. 3 includes more fiber in the given area 302 than the system of FIG. 2). It would be understood that in the single dimensional topology of FIG. 2, the greatest length of fiber that can be oriented in the rectangular area 302 is equal to the largest diagonal associated with the area, as in fact is the case in FIG. 2. However, in the two dimensional fiber topology of FIG. 3, a greater length of fiber can be placed in the same rectangular area. Accordingly, in one embodiment of the disclosed, two dimensional topology, the length of fiber oriented in a given rectangular area is greater than the largest diagonal associated with the given area. In alternative embodiments, the length of fiber oriented in a given rectangular area is 10%, 20% or 50% greater than the largest diagonal associated with the rectangular area.

Figure 4:
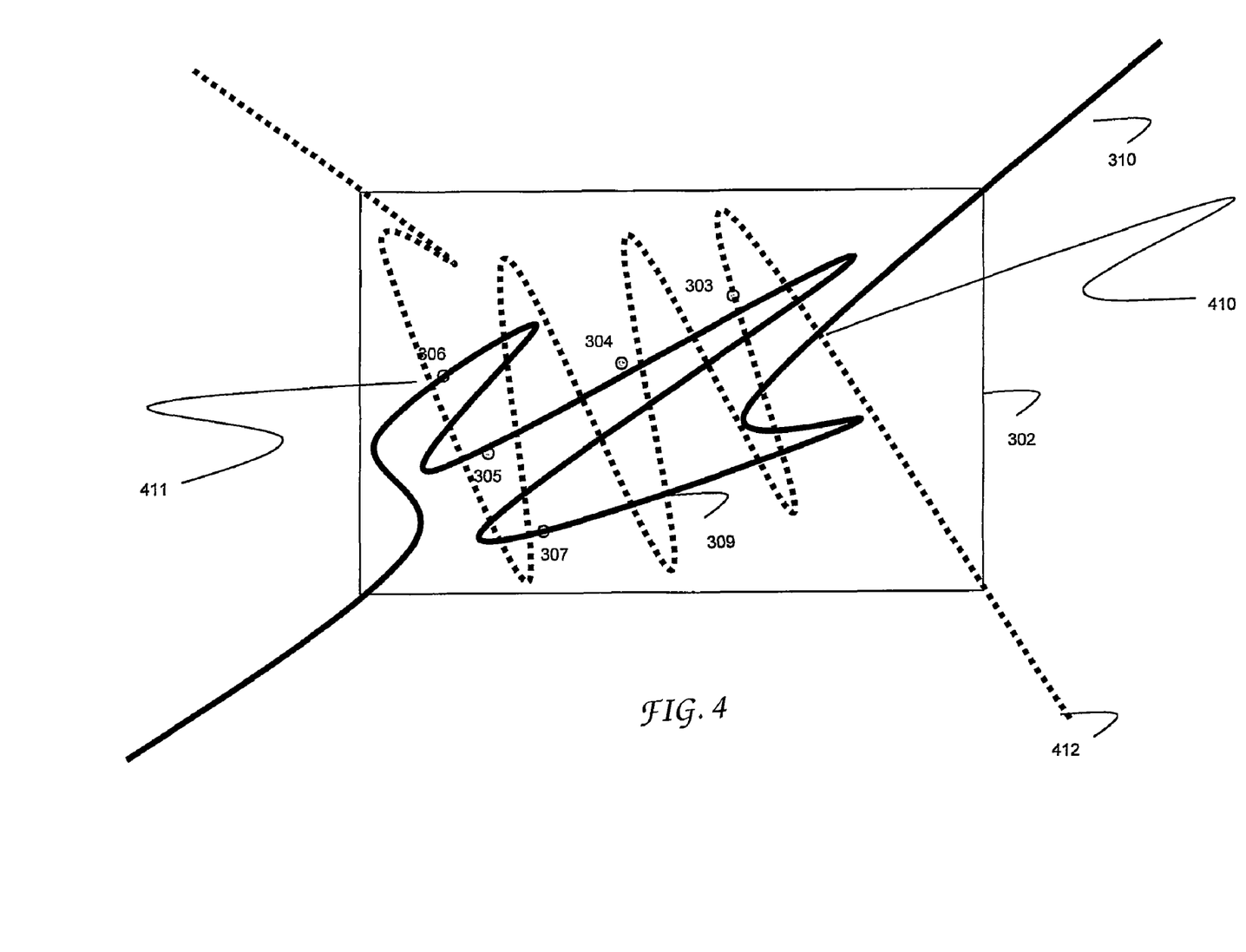
FIG. 4 is schematic representation of yet another alternative fiber topology in accordance with an embodiment of the present invention.

Another further application of the disclosed technology is shown in FIG. 4, in which items from FIG. 3 are reproduced with the same identifying numbers. In the topology illustrated in FIG. 4, there are two fibers 310 and 412 each of which is oriented in a two dimensional topology with the two fibers at least partially overlapping each other, with sections oriented approximately perpendicularly to each other. Each of these fibers may have its own source of optical energy, detector, and associated instrumentation as shown for example in FIG. 1. Alternatively, there may be one set of instrumentation which services both fibers.

In FIG. 4, 410 is one of the points where the two fibers overlap. In alternative applications, the fibers overlap at multiple points. It would be understood that the dual fiber topology of FIG. 4 will enable the determination of the spatial location of the various disturbances with much greater resolution because of the two dimensional nature of the topology of each fiber and the overlapping and approximately perpendicular nature of the orientation of the fibers. It will further be understood by persons having ordinary skill in the art that the degree and angle of overlap can vary over a wide range of values.

In FIG. 4, fiber 401 has overlapping points between 410 and 411. The lengths of the fibers from 410 to 411 are the portions of the fiber having overlapping points. That portion is greater, for example, than 10% of the total fiber length. It would be understood that in FIG. 4 any degree of overlap will result in a resolution improvement. While the foregoing discussion has been with reference to two fibers, it would be understood that the number of fibers can vary and any number of fibers may be used to further improve the resolution of the system.

As discussed above, many fiber surveillance technologies determine the location of the disturbance based only on the distance along the fiber of the detected disturbance. This determination is most often made by measuring signal strength as a function of distance along the fiber, as measured for example by delay between the time that the source optical signal is injected into the fiber and the time that the reflected signal is detected. However, when the orientation of the fiber is two-dimensional rather than one dimensional, the exact location (e.g., geographic location, location along a pipeline, etc.) of any point along the fiber may not be known. Accordingly, the location of a disturbance may not be determinable simply based on the distance along the fiber where the disturbance is located. Therefore, it would be advantageous to know the location of points along the fiber as a function of its distance of the points along the fiber. The location of points along the fiber can be determined by imposing a vibration or other acoustic signal at known points along the fiber. In this way, the location of the fiber can be mapped and the distance along the fiber can be associated with a specific location. Such characterization of the fiber location can be accomplished by using, for example, well-known crystal controlled vibrating rods. As the rod is moved relative to the fiber, both along the fiber and perpendicular to it, the signal will be maximum when the rod is exactly over the fiber. In this way, the fiber may be calibrated to determine the exact location of any point along the fiber.

In accordance with a further feature of the present invention, not only can the location of a disturbance be determined, but if the source of the disturbance moves, its location can be determined at different times. Accordingly, the path of travel and the velocity of motion, as well as other characteristics of the motion, can be determined. In alternative embodiments of the invention, this information can be used to provide advanced warning not only of unauthorized activity, but of impending collisions between moving objects or between a moving a stationary objects.

In accordance with an embodiment of the present invention, the fiber surveillance system can be used to monitor oil and/or gas pipelines. FIGS. 5A, 5B, 5C, and 5D are schematic diagrams of various embodiments of the present invention adapted to monitor a pipeline 500. FIGS. 5A, 5B, 5C, and 5D use the same identifying reference numbers to identify common components.

Figure 5A:
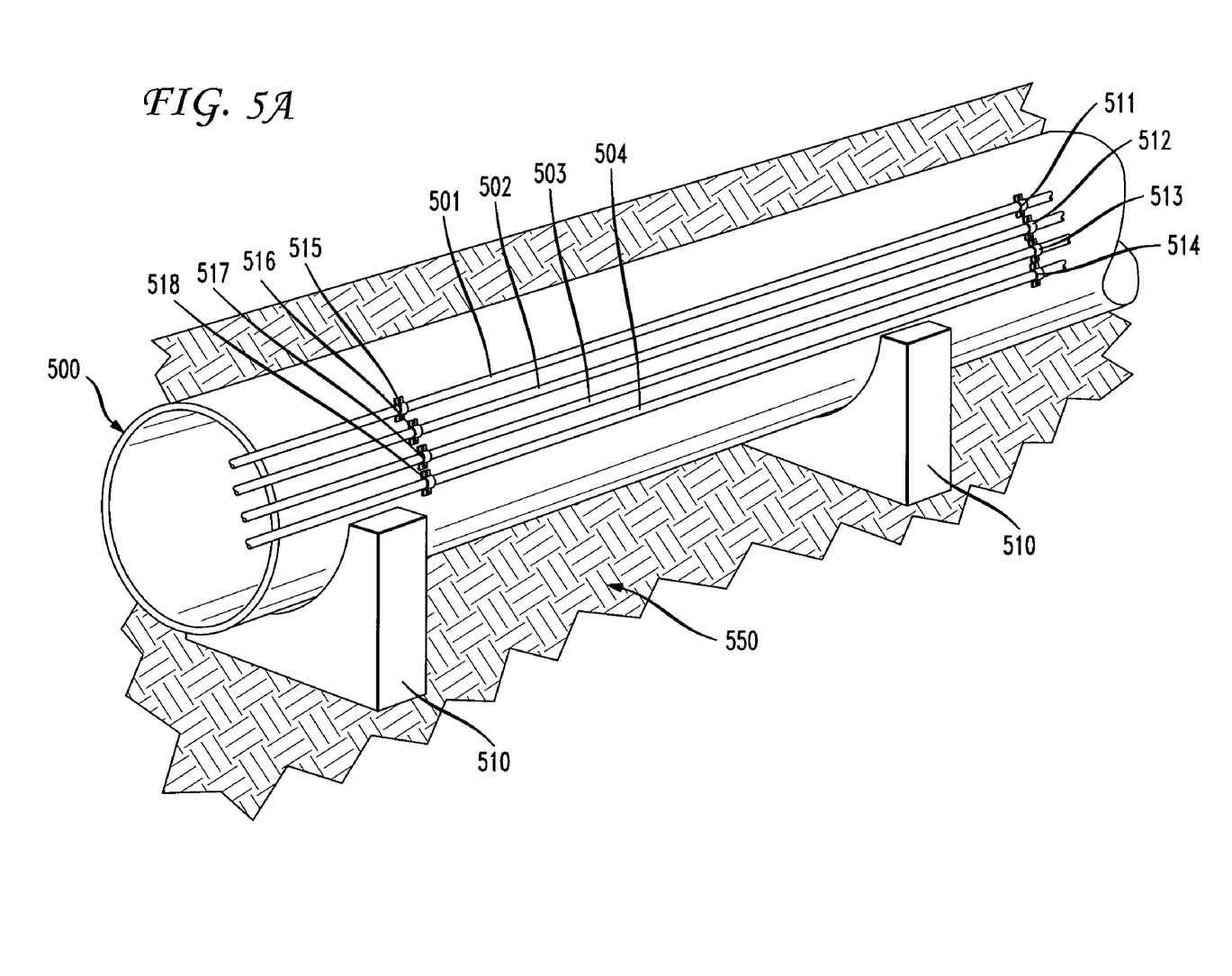
FIG. 5A is a schematic representation of an embodiment of the present invention.

As illustrated in the embodiment of FIG. 5A, fibers 501, 502, 503, and 504 (e.g., 501-504) are attached to the outside of pipeline 500. The fibers 501-504 will have associated instrumentalities, as described above, for injecting optical signals into the fibers and detecting return signals that are characterized depending on the type of optical scattering technology being used such as Rayleigh scattering or OTDR. Various techniques can be used to attach the fibers 501-504 to the pipeline 500. For example, as illustrated, fiber 501 is attached to the pipeline 500 by U-bolts 511 and 515. Fiber 502 is attached by U-bolts 512 and 516. Fiber 503 is attached by U-bolts 513 and 517. Fiber 504 is attached by U-bolts 514 and 518. Other U-shaped fasteners or U-channels could also be used.

Alternative, the fibers can be attached to the inside of the pipeline, for example using U-shaped fasteners, cements, or adhesives. Fibers can be blown through a section of a pipeline using installation techniques known to one of ordinary skill in the art. In this manner, a fiber can be blown through the interior of several miles of installed pipeline, depending on the weight and size of the fiber cable. Fibers internal to the pipeline can be routed around valves in the pipeline to prevent damage to the fiber when the valve is moved.

In yet a further alternative, the fibers of the surveillance system can be embedded in the pipe of the pipeline 500. For example, each segment could include one or more fibers that are embedded in the shell of the pipe. Depending on the method of pipe construction, these fibers can be embedded as the section of pipe hardens, co-extruded with the pipe, or placed within a channel that is formed in the interior surface or exterior surface of the pipeline.

Figure 5B:
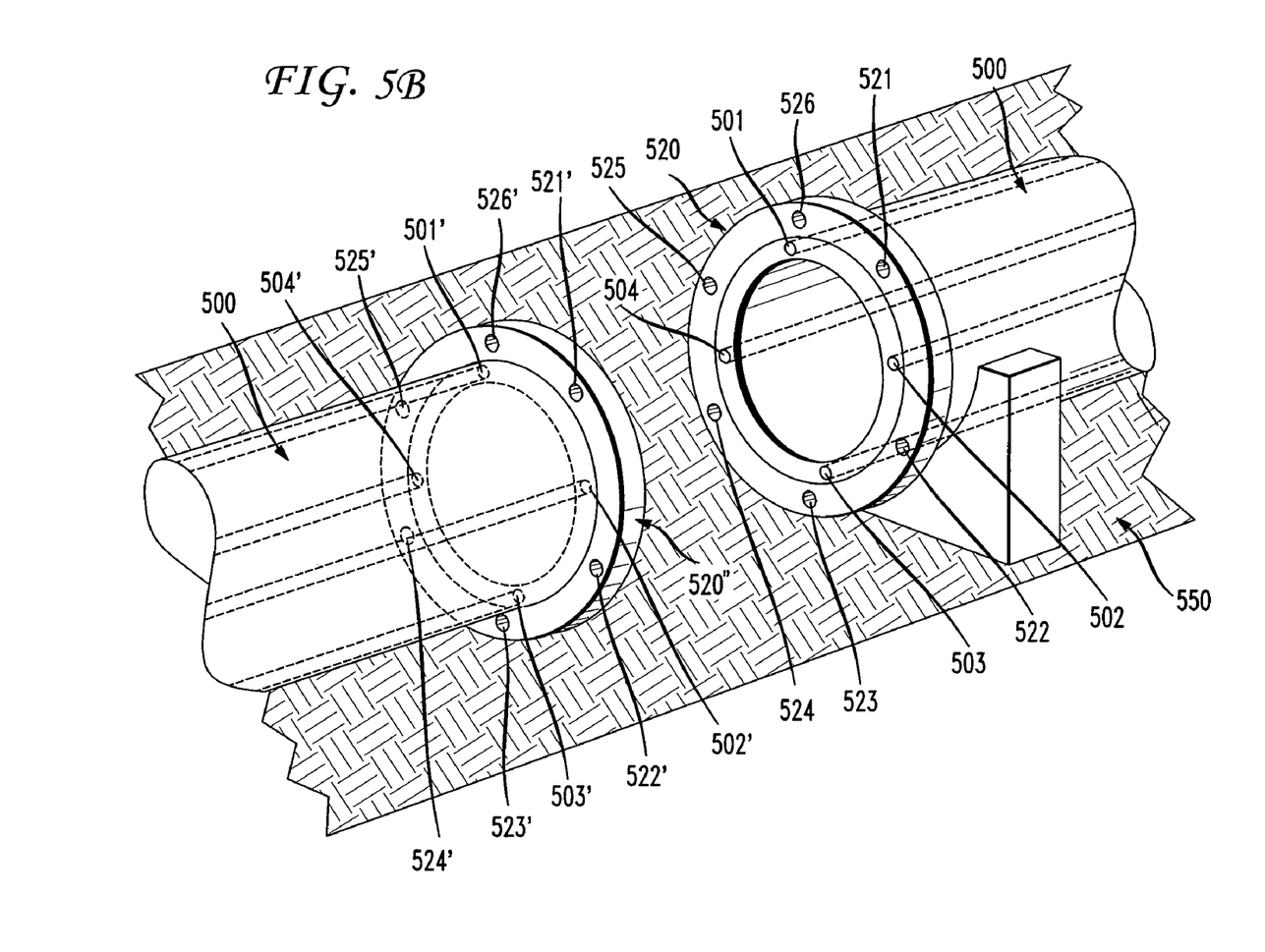
FIG. 5B is a schematic representation of an embodiment of the present invention.

FIG. 5B illustrates an embodiment of the present invention in which fibers 501, 502, 503, and 504 are embedded in pipeline 500. The fibers 501, 502, 503, and 504 will have associated instrumentalities for injecting optical signals into the fibers and detecting return signals that are characterized depending on the type of optical scattering technology being used such as Rayleigh scattering or OTDR. Pipeline 500 is a generally hollow cylinder having a run-length from one end of the cylinder to the other. The pipeline 500 includes a flange connector 520 having holes 521, 522, 523, 524, 525, and 526 adapted to receive for connecting bolts. Flange 520 can bolted to flange 520', having holes 521', 522', 523', 524' (not shown), 525 (not shown), and 526' of pipeline 500', so as to connect the two sections of pipeline 500 and 500'. As illustrated, pipeline 500' includes embedded fibers 501', 502', 503', and 504'. The sections of pipeline 500 and 500' are preferably constructed such that when flange 520 and 520' are aligned and connected fiber 501 is aligned with fiber 501', fiber 502 is aligned with fiber 502', fiber 503 is aligned with fiber 503', and fiber 504 is aligned with fiber 504'. Optionally, the ends of the embedded fibers include optical connectors to transmit the injected optical energy between segments of pipeline. Alternatively, during installation of the pipeline, each pair of aligned fibers can be fused together. The length of the embedded fibers would be at least the run-length of the pipe 500 or 500'. However, if the embedded fibers do not follow a linear path that is parallel to the axis of the cylinder (e.g., as described below with respect to FIGS. 5C and 5D), the length of the embedded fibers can be greater than the run-length of the pipeline.

While the systems of FIGS. 5A and 5B are illustrated as having four fibers 501-504, one of ordinary skill in the art would recognize that a single fiber could be used. Alternatively, two, three, four, or more fibers can be included in the system. More fibers can increase sensitivity to disturbances and provide more data for correlating the types of disturbances, location of disturbances, and the operating conditions of the pipeline.

Figure 5C:
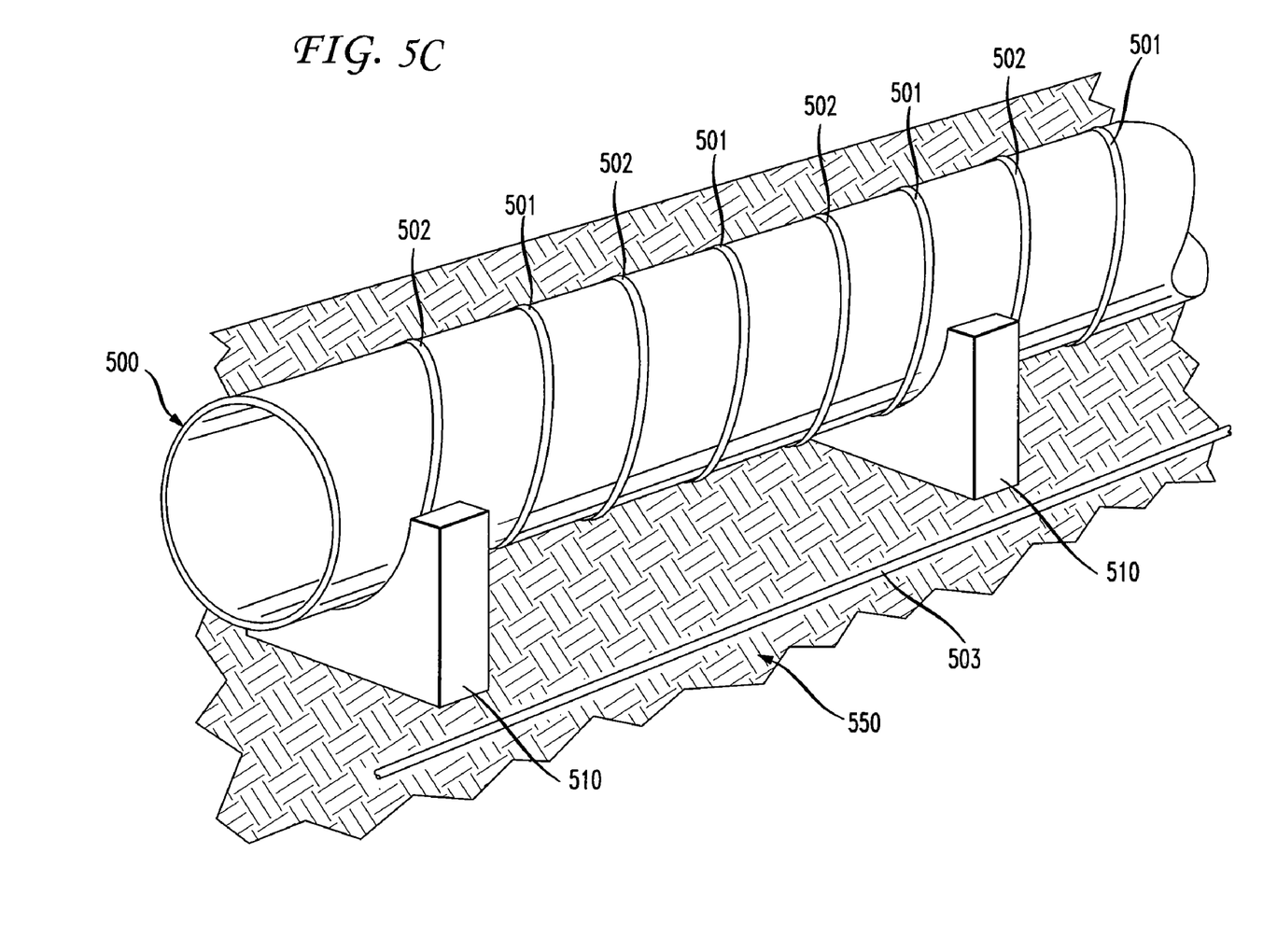
FIG. 5C is a schematic representation of an embodiment of the present invention.

A further embodiment of the present invention is illustrated in FIG. 5C. The pipeline 500 of FIG. 5C is fitted with fibers 501 and 502 which are wrapped around the pipeline 500 in a double helix configuration. The fibers 501 and 502 will have associated instrumentalities for injecting optical signals into the fibers and detecting return signals that are characterized depending on the type of optical scattering technology being used such as Rayleigh scattering or OTDR. This configuration increases the total length of fiber used for sensing in a given segment of pipeline 500. As similarly discussed above with respect to FIGS. 5A and 5B, a single fiber 501 could be wrapped around pipeline 500 in a helical configuration, or multiple fibers (e.g., 2, 3, 4, etc.) can be configured in a n-helix configuration, where n is the number of fibers, to further increase the total length of fiber. Additionally, the pitch of the helix (i.e., the width of one complete helix turn), or n-helix, can be modified to increase or decrease the total length of fiber for a given segment of pipeline 500.

Alternatively, as illustrated in FIG. 5C, a fiber 503 can be buried near the pipeline 500. Physical coupling of the fiber 503 to the pipeline 500 is not required to observe the effect of sounds generated by tampering with the pipeline or disturbances near the pipeline. The optical fiber 503, however, is preferably acoustically coupled to the pipeline 500. That is, the optical fiber 503 should be located such that sounds emitted by the pipeline 500 affect the return signal of the optical energy launched into the fiber 503. For example, if the pipeline 500 is buried, the fiber 503 can be buried near the pipeline 500 or located on the surface near the ground. The distance of the fiber 503 from the pipeline 500 can be limited by the acoustic conductivity of the soil or other materials between the fiber 503 and the pipeline 500. In a further example, as illustrated in FIG. 5, the pipeline 500 is held above the ground by pedestals 510. Pedestals 510 are preferably composed of concrete or a metallic substance. The fibers can optionally be run through the pedestals 510 of the pipeline. Alternatively, because concrete and metal (i.e., the compositions of the pedestals 510) conduct sound, the fiber 503 can be buried in the ground near the pipeline 500, as the sounds emitted by the pipeline 500 will be transmitted through the pedestals 510 and the ground 550.

In a further alternative, the pitch of fiber 501 can be different than the pitch of fiber 502. In this configuration, the helical fiber having the smaller pitch will complete more rotations of the pipeline 500 than the other fiber. Consequently, the fibers will periodically overlap so as to form a three-dimensional mesh, as similarly discussed above with respect to FIGS. 3 and 4.

Figure 5D:
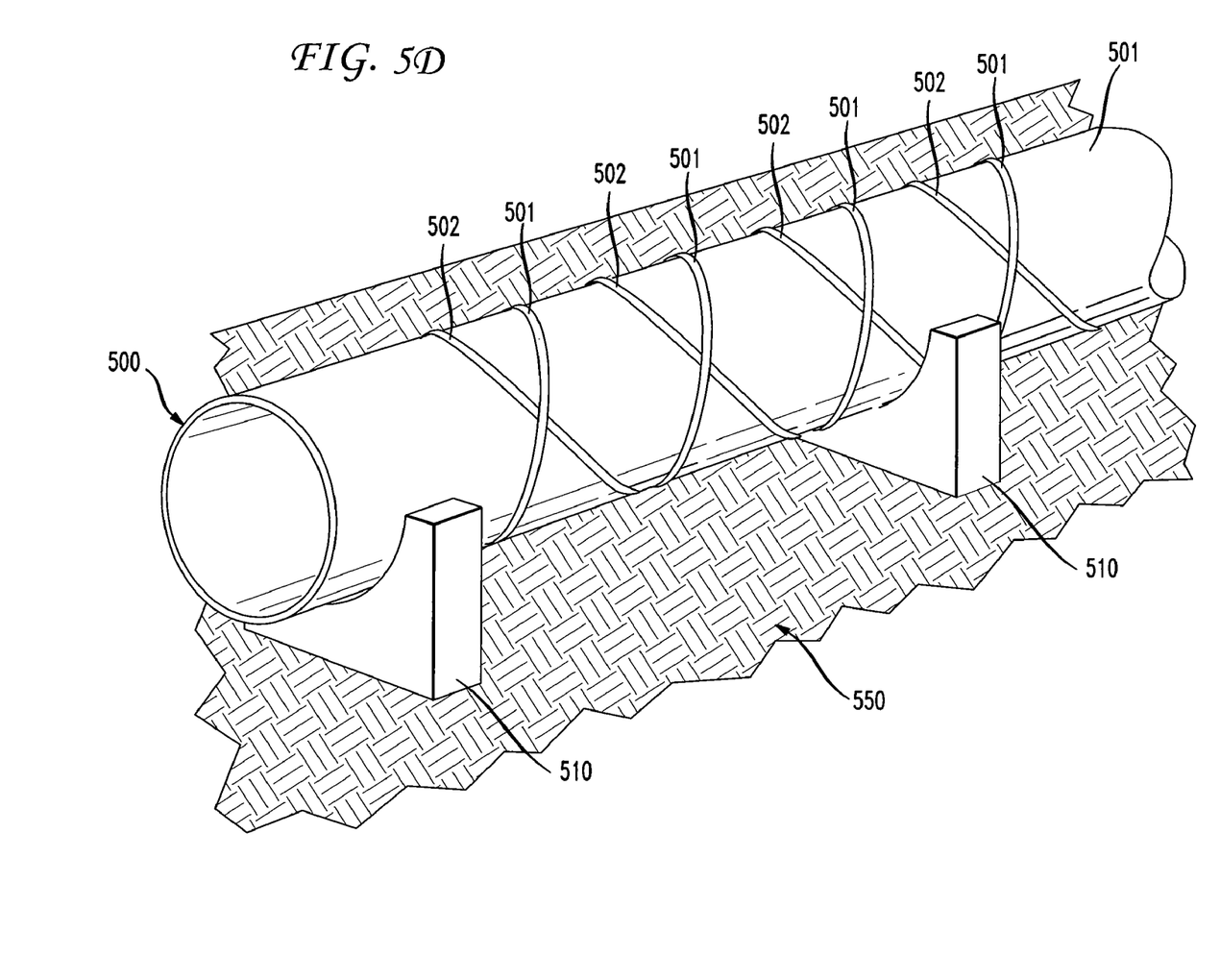
FIG. 5D is a schematic representation of an embodiment of the present invention.

A mesh of fibers may also be formed about a pipeline segment as illustrated in FIG. 5D. Fibers 501 and 502 of FIG. 5D are wrapped in a helical configuration around the pipeline 500. The fibers 501 and 502 will have associated instrumentalities for injecting optical signals into the fibers and detecting return signals that are characterized depending on the type of optical scattering technology being used such as Rayleigh scattering or OTDR. Fiber 501 has the opposite handedness (e.g., left-handed or right-handed) of fiber 502. That is, if fiber 501 rotates clockwise about the axis of the pipeline 500, fiber 502 rotates counter-clockwise about the axis of the pipeline 500. Thus, if the helixes of fibers 501 and 502 have the same pitch, fibers 501 and 502 will overlap twice for each complete turn of the fiber. As discussed above, the number of intersections of fibers 501 and 502 can be increased or decreased by adjusting the ratio of the pitch of fiber 501 to fiber 502.

While FIG. 5D illustrates both of fibers 501 and 502 in a helical configuration, it would be understand by one of ordinary skill in the art that the fibers acoustically coupled to the pipeline 500 can form various topologies and are not required to form a regular curve. However, in some circumstances, the manufacture of pipes or deployment of fiber for inclusion in a pipeline surveillance system can be more efficient by employing a regular curve so as to utilize a repetitive or regular process.

While the mesh of fibers around pipeline 500 is three-dimensional in a Cartesian system, the mesh can be thought of as a two-dimensional plane wrapped about the pipeline 500, or a two-dimensional topology in a cylindrical coordinate system. That is, the mesh of fibers 501 and 502 align about a surface of a cylinder. For example, the rectangular area 302 illustrated in FIGS. 2, 3, and 4 could be wrapped around the pipeline 500 to create the fiber mesh. Thus, as described above, the mesh can be used to determine the location on the pipeline at which a disturbance is occurring.

The optical signals generated by different disturbances will have characteristics unique to the particular disturbance. For example, the optical signal will be a function of the weight or force of the source of the disturbance as well as any motion associated with the disturbance. Similarly, any acoustic output associated with the source will also affect the signal. For example, and with reference to deployment of a surveillance topology along a pipeline, a unique signal will be associated with the use of tools on the pipeline for construction, repair, or unauthorized tampering (e.g., sabotage, terrorism, or vandalism). Alternatively, vehicular traffic near the pipeline will have its own unique signature.

Noise generated by or from within the pipeline will also have a unique signature. Thus, in one application of the present invention, information about the operation of the pipeline can be determined based on the characteristics of the received signal. For example, the present invention can be used to monitor and measure the flow of oil or gas through the pipeline so as to determine the pressure within the pipeline, the percentage fill of the pipeline, the velocity of the oil or gas in the pipeline, or the flow rate within the pipeline.

The present invention can also be used to monitor the structural integrity of the pipeline. For example, the stresses and strains experienced by the pipeline can be monitored and measured based on the characteristics of the received return signal. If the pipeline should begin to weaken, the characteristics of the return signal will be altered due to the change in the way sound is conducted through the pipe. If the fault or potential fault is at a specific location in the pipeline, the present invention can be used to determine the location of the fault using the techniques described above. Additionally, leaks in the pipeline can also be detected and located.

The information gathered by the monitoring of the pipeline can act as an early warning system as well as an automated safety system. For example, based on the operating conditions of the pipeline, various actions can be taken. For example, if the pressure within the pipeline exceeds a predetermined critical level, the monitoring system can be configured to generate an alarm, take the necessary actions to reduce the pressure, and/or shutdown the pipeline. Alternatively, if a leak is detected at a particular location, an autonomous monitoring system can generate an alarm, shutdown the pipeline at least with respect to the location of the leak, or reroute around the leak by opening and closing the appropriate valves.

Figure 6:
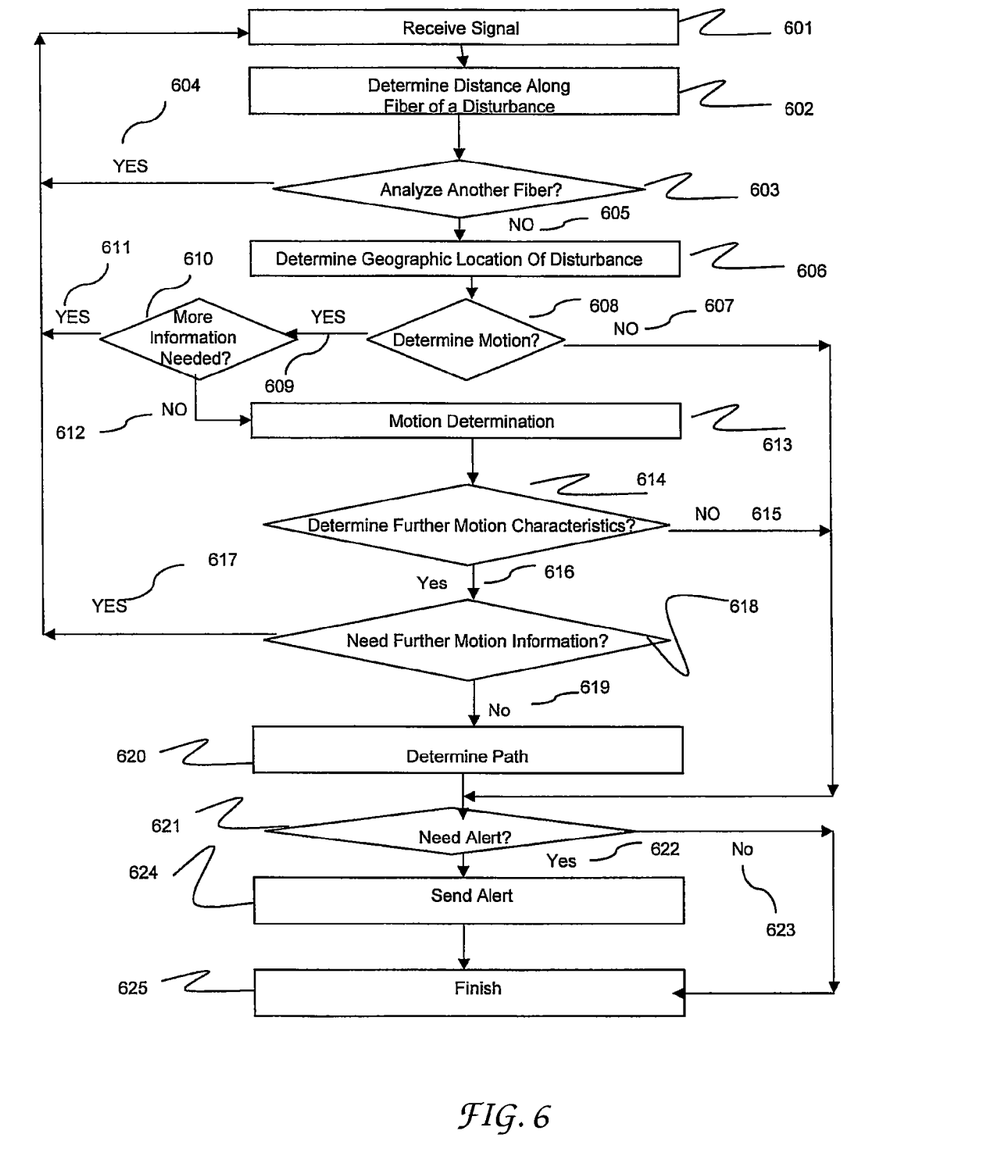
FIG. 6 is a schematic representation of an exemplary methodology used in accordance with an embodiment of the present invention.

A generic methodology for use with the present invention is shown in FIG. 6. In this Figure, at 601 a return signal is received from a fiber that is positioned in accordance with the present invention. The return signal may be associated with any appropriate fiber surveillance scattering technology, such as Raleigh scattering or OTDR. At 602, the location, along the fiber, of the disturbance associated with the return signal, is determined, perhaps based on previous calibration using known vibration sources. At 603 it is determined if there is another fiber associated with the surveillance system. If there is such other fiber, the method continues at 604, and a signal associated with the second fiber is received at 601 and the location, along the second fiber, of the disturbance associated with the second return signal is determined at 602. This loop continues until all fibers in the system have been monitored. Of course, it would be understood that, in alternative embodiments, the method need not analyze the return signal from every fiber in the system. In any event, at 605 if no further fibers are to be monitored for received signals the method proceeds to 606 where the various locations along the fiber that have been determined at 602 are correlated with each other, and perhaps with calibration information discussed above, to determine the location of the disturbance.

At 608 it is determined if motion characteristics of the disturbance are desired. If at 609, such motion characteristics are desired, then at 610 it is determined if more information is needed to determine such motion characteristics. If more information is needed, then at 611, the analysis loop is repeated and the various measurements are made again at a second time. This loop is repeated until at 612 it is determined that no further information is needed for motion analysis. The motion characteristics of the disturbance are then determined at 613 based on the measurements associated with the different times. If motion characteristics of the disturbance are not necessary, then the method proceeds at 607.

At 614 it is determined if further motion characteristics of the disturbance, such as the path, are desired. If such characteristics are not desired then the methodology proceeds at 615. If at 616 it is determined that further motion characteristics of the disturbance, such as the path, are desired then at if 618 it is determined if further information, such as the location of the disturbance at a third time, is necessary to obtain such further motion characteristics. If at 619 no further measurements are necessary, then the methodology proceeds to 619. If at 617 such further information is needed, then, the methodology proceeds to obtain more information, for example, at different times, until at 619 no further measurements are necessary. At 620 further motion characteristics, such as the path of the disturbance are then determined.

If at 607 it is determined that motion characteristics are not desired, or if at 616 it is determined that no further motion characteristics are desired, then it is determined at 621 if an alert is necessary, for example, based on the location, motion or path data, because of, for example, unauthorized or suspicious activity, or an impending collision. If at 623 it is determined that an alert is not necessary, then the method proceeds to a finish at 620. However, if at 622 it is determined that an alert is necessary, then at 624 an alert, and/or any further appropriate action is performed or initiated and the process finishes at 625. The alert may, for example, take the form of a communication to appropriate authorities or can be a local visual or audible alert.

Figure 7:
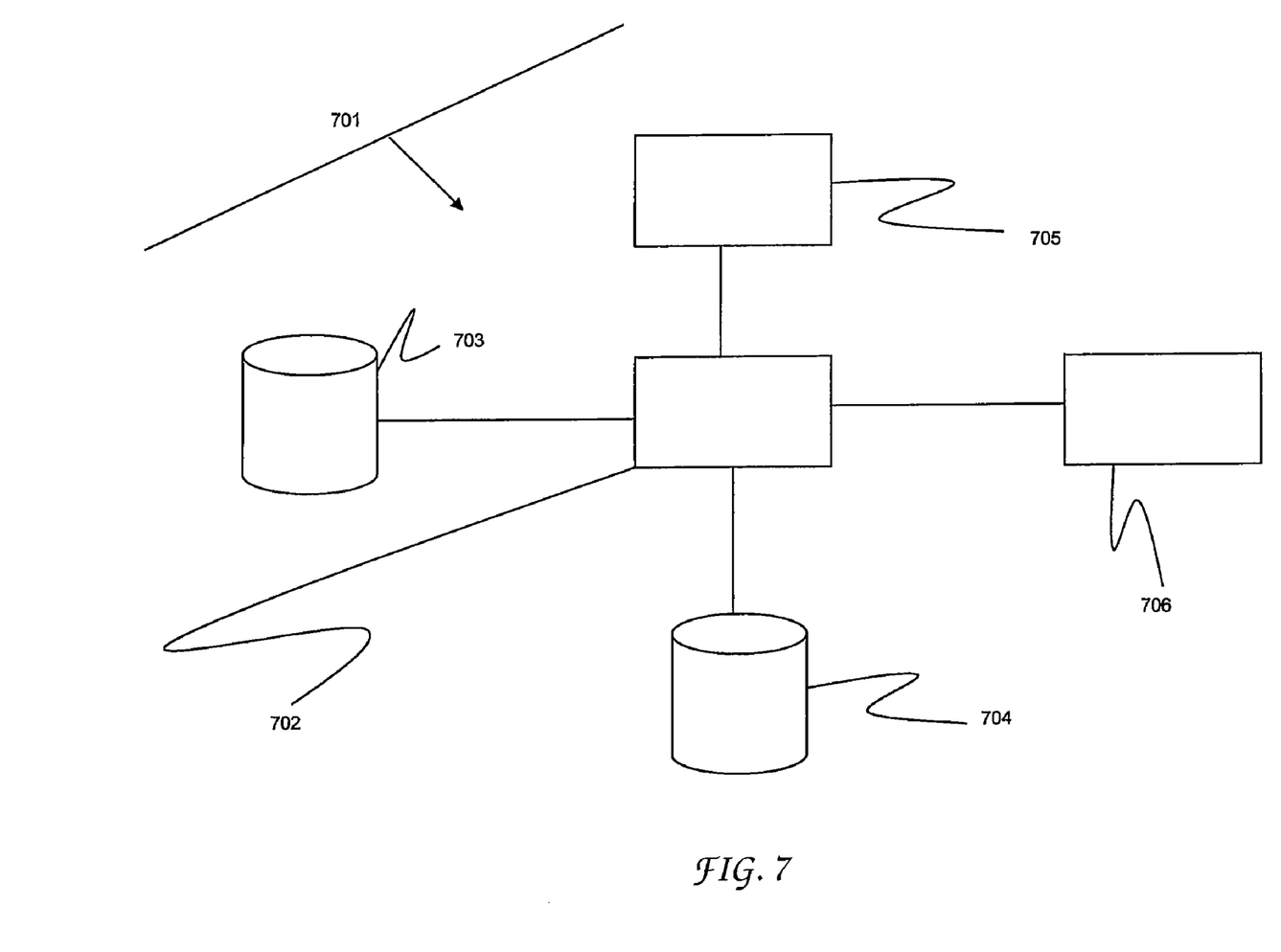
FIG. 7 is a schematic representation of a computer that may be used to implementing methodologies in accordance with the present invention.

A high-level block diagram of a computer that may be used to implement the methodology of FIG. 6 is illustrated in FIG. 7. Computer 701 contains a processor 702 which controls the overall operation of the computer 701 by executing computer program instructions which define such operation and implement the methodology of FIG. 6. The computer program instructions may be stored in a storage device 703, or other computer readable medium (e.g., magnetic disk, CD ROM, etc.), and loaded into memory 704 when execution of the computer program instructions is desired. Thus, the method steps of FIG. 6 can be defined by the computer program instructions stored in the memory 704 and/or storage 703 and controlled by the processor 702 executing the computer program instructions. For example, the computer program instructions can be implemented as computer executable code programmed by one skilled in the art to perform an algorithm defined by the method steps of FIG. 6. Accordingly, by executing the computer program instructions, the processor 702 executes an algorithm defined by the method steps of FIG. 6. The computer 701 also includes one or more network interfaces 705 for communicating with other devices via a network. The computer 701 also includes input/output devices 706 (e.g., display, keyboard, mouse, speakers, buttons, etc.) that enable user interaction with the computer 701. One skilled in the art will recognize that an implementation of an actual computer could contain other components as well, and that FIG. 7 is a high level representation of some of the components of such a computer for illustrative purposes Technologies such as those disclosed in references discussed in the BACKGROUND section of this disclosure may be applied to the present invention. Accordingly, some of the disclosure from those Publications will be quoted here to give this specification an exemplary context. However, it would be understood by those having ordinary skill in the art that the present invention can be implemented with any appropriate optical scattering technique, including but not limited to Raleigh scattering and OTDR, and/or any optical signal analysis technique useful in optical surveillance systems The technology disclosed in the patent publications referenced above involves launching optical pulses into a buried optical fiber and detecting the signal backscattered by the fiber. The optical frequency of one pulse within a pair of pulses differs slightly from the optical frequency of the other pulse within the pair of pulses. This frequency difference (or separation) itself varies from one pair of pulses to the next. This variation in frequency difference results in a detected backscattered signal having a phase that is modulated by an acoustic signal in the vicinity of the fiber, allowing decoding of the disturbance with improved signal to noise ratio, reduced fading and a linear output.

In the present invention, as well as in the technology disclosed in the referenced patent publications, the following definitions apply: The pulses may be considered as individual pulses, pairs of pulses or groups of pulses; The term "launching" includes introducing the pulse into the fiber or transmitting the pulse in the fiber; The term "optical" as used herein may refer to the region of the electromagnetic spectrum that is visible, generally considered to be between approximately 380 nm and 760 nm. However, depending on the application, the term "optical" as used herein can extend into what is sometimes referred to as the infrared and ultraviolet range of the spectrum, for example from 200 nm to 5,000 nm, or 10 nm to 100,000 nm. In any event, the term "optical" will apply to any frequency which is used to transmit data or voice in or through optical fibers; and while the discussion is in terms of an optical fiber, in alternative embodiments pulses outside the optical spectrum may be launched into any appropriate medium that will transmit the pulses.

In a specific embodiment disclosed in those patent publications, where the pulses are 20 meters wide, the frequency difference is on the order of 5 MHz and varies by about 5 MHz from one pulse pair to the next. In alternative embodiments, the frequency difference can range from approximately 1 MHz to approximately 5 MHz. For these parameters, each pulse pair results in independent scattering, yielding improved signal to noise ratio. These parameters also result in a relative phase shift of the interference between pulses within each pulse pair on the order of Pi, yielding reduced fading if multiple pulse pairs are used. (Note that it is possible to detect the scattering of each pulse pair from the same section of fiber to within the spatial width of the pulse.)

Both the amplitude and the phase of the beat signal are affected by acoustic disturbances that may be present in the vicinity of the fiber. In one embodiment, the amplitude and phase is extracted from the scattered signal using known complex demodulation techniques. Demodulation is performed at the known frequency difference between pulses in a pair. Such demodulation may be performed by multiplying the reflected signal at the difference frequency by the sine and cosine of the difference frequency. This results in both sinusoidal components and a DC component. For a specific embodiment, a low pass filter with cut-off frequency in the vicinity of 5 MHz isolates the DC component. (Note that if this low pass filter is too narrow it will blur the spatial resolution of the result and if it is too broad it will include the results from the next pair of pulses that may be separated by about 10 MHz yielding a result that is not independent.) The DC component reflects the phase and amplitude of the scattered signal. Rectangular to polar conversion enables the independent determination of the phase and amplitude. The phase will drift relative to the local demodulating signal because of small, slow-varying, changes in environmental parameters. Accordingly, to remove this drift, a high pass filter is used on the phase signal after the rectangular to polar conversion. In this way, only the acoustic signal is observed. Detection techniques that only measure the amplitude suffer from low signal to noise ratio, fading and nonlinearity. The present invention, by using pulse pairs with appropriate frequency spacing and by analyzing the phase of the scattered beat signal, results in improved signal to noise ratio, reduced fading, and an output that is linear over a larger dynamic range.

The discussion to this point has focused on a single pulse pair that is transmitted through the fiber. If, for this single pulse pair, we want to look at every 20 meters of fiber, we sample accordingly in time, knowing the time of launch. In analyzing the results, N analysis "bins" may be used, one bin for each 20 meter section of fiber. When multiple pulse pairs are used at some pulse repetition rate then for each bin data will arrive at the pulse repetition rate. A filter is applied to limit the signal to the acoustic band of interest—usually between 1 Hz and 200 Hz for acoustic coupling through the ground. A low pulse repetition frequency limits the maximum acoustic frequency that can be detected without aliasing. A given frequency difference cannot be reused in a second pulse pair until we have observed all of the backscattering from that frequency difference. Accordingly, a given frequency difference cannot be reused until the round trip time within the cable passes. A 2.5 kHz pulse repetition rate is compatible with a cable length of about 25 miles.

There is still an amplitude variation in the observed signal and if the amplitude gets too low, the signal to noise ratio is poor. In those circumstances, the low amplitude result may be disregarded or given low weight. Additionally, a phase unwrap algorithm may be used to obtain greater dynamic range. Because of the discontinuity in arctan as the phase exceeds the range −Pi to +Pi, it is advantageous to add the results at the discontinuity to remove that artifact. If there is no acoustic disturbance, there is no change in the phase and amplitude. If there is an acoustic disturbance, it results in very small local changes in fiber length and a linear change in the phase reflecting linear strain in the fiber.

The duty cycle may be improved by launching pulse pairs with different frequency deltas for the various pulse pairs. In this way, multiple pairs may be propagated in the fiber at one time and their signals can be differentiated by observing the appropriate deltas. The analysis for a second pulse pair is the same as that described above for the first pulse pair except that the demodulating frequency is the new delta. After the high pass filtered phase result is obtained, it is combined with the appropriate bin from the previous pulse—using a time shift reflecting the time difference between the first and second pulse pair. The resultant acoustic signals will add coherently. That is, if the acoustic signal is varying, the detected variation between the first and second pulse pairs will be in phase and add constructively resulting in improved signal to noise ratio. Additionally, if one of the results for the first pulse pair is faded or has low amplitude, the results for the second pulse pair is highly unlikely to show similar effects because of the pi shift in the deltas.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for determining operating information about a section of a pipeline comprising:
   injecting optical energy into a first optical fiber acoustically coupled to the section of the pipeline;
   injecting optical energy into a second optical fiber acoustically coupled to the section of the pipeline;
   receiving from the first optical fiber, a first optical return-signal resulting from an acoustic energy emitted from the section of the pipeline;
   receiving from the second optical fiber, a second optical return-signal resulting from an acoustic energy emitted from the section of the pipeline; and
   analyzing the first optical return-signal and the second optical return-signal to determine the operating information about the section of the pipeline, wherein the first optical fiber and the second optical fiber are wrapped around the section of the pipeline in a double helix configuration and the operation information includes a fill level of the section of the pipeline and a velocity of content in the section of pipeline.

2. The method of claim 1, wherein analyzing the first optical return-signal and the second optical return-signal includes comparing the received first optical return-signal and the second optical return-signal to previously received signals.

3. The method of claim 1, wherein the operating information includes at least one stress of the section of the pipeline and strain of the section of the pipeline.

4. The method of claim 1, wherein the operating information includes a likelihood of failure.

5. The method of claim 1, wherein the operating information includes at least one of a pressure of the section of the pipeline and a flow rate of the section of the pipeline.

6. The method of claim 1, wherein the first optical fiber and the second optical fiber are physically coupled to the section of the pipeline.

7. The method of claim 1, wherein the analyzing the first optical return-signal and the second optical return-signal further comprises:
   determining a location along the section of the pipeline at which an acoustic signal is emitted.

8. The method of claim 1, wherein the optical energy is from a common source of optical energy.

9. A method for determining operating information about a section of a pipeline comprising:
   injecting optical energy into each of a plurality of n optical fibers acoustically coupled to the section of a pipeline;
   receiving from each of the plurality of n optical fibers, an optical return-signal resulting from an acoustic energy emitted from the section of a pipeline; and
   analyzing the optical return-signal from each of the plurality of n optical fibers to determine the operating information about the section of a pipeline, wherein the plurality of n optical fibers are wrapped around the section of a pipeline in an n-helix configuration and the operation information includes a fill level of the section of the pipeline and a velocity of content in the section of pipeline.

10. The method of claim 9, wherein analyzing the optical return-signal from each of the plurality of n optical fibers includes comparing the optical return-signal from each of the plurality of n optical fibers to previously received signals.

11. The method of claim 9, wherein the operating information includes at least one stress of the section of the pipeline and strain of the section of the pipeline.

12. The method of claim 9, wherein the operating information includes a likelihood of failure.

13. The method of claim 9, wherein the operating information includes at least one of a pressure of the section of the pipeline and a flow rate of the section of the pipeline.

14. The method of claim 9, wherein the plurality of n optical fibers are physically coupled to the section of the pipeline.

15. The method of claim 9, wherein the analyzing the optical return-signal from each of the plurality of n optical fibers further comprises:
   determining a location along the section of the pipeline at which an acoustic signal is emitted.

16. The method of claim 9, wherein the optical energy is from a common source of optical energy.

* * * * *